July 25, 1939. R. J. EMMERT Re. 21,159

ACOUSTIC DEVICE

Original Filed Nov. 10, 1930 3 Sheets-Sheet 1

Inventor
Rodger J. Emmert.
By Spencer, Hardman and Fehr
His Attorneys

ACOUSTIC DEVICE

Original Filed Nov. 10, 1930 3 Sheets-Sheet 2

Inventor
Rodger J. Emmert.

By Spencer, Hardman & Fehr
His Attorneys

July 25, 1939. R. J. EMMERT Re. 21,159

ACOUSTIC DEVICE

Original Filed Nov. 10, 1930 3 Sheets-Sheet 3

Inventor.
By Rodger J. Emmert.
Spencer, Hardman and Fehr
His Attorneys

Reissued July 25, 1939

Re. 21,159

UNITED STATES PATENT OFFICE 21,159

ACOUSTIC DEVICE

Rodger J. Emmert, Birmingham, Mich., assignor, by mesne assignments, to Radio Corporation of America, New York, N. Y., a corporation of Delaware Original No. 2,010,537, dated August 6, 1935, Serial No. 494,646, November 10, 1930. Application for reissue August 14, 1936, Serial No. 96,126

2 Claims. (Cl. 179—115.5)

Figure 1:
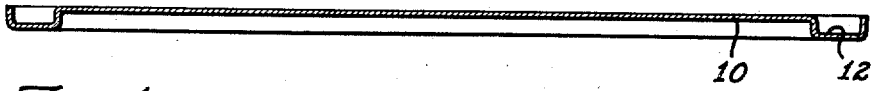

This invention relates to an acoustic device and particularly to an acoustic device having a frusto-conically shaped support having a conical or frusto-conical diaphragm.

An object of this invention is to improve upon the methods of manufacture of the loud speaker so as to produce a loud speaker that is substantial, rigid, efficient, and economical to produce. This has been accomplished by simplifying the construction by reducing the number of parts to a minimum consistent with skilled workmanship, reducing the number of operations in the manufacture of the speaker, reducing the amount of labor required and reducing the cost by saving time, labor, and material.

Another object of this invention is to provide a cone support made from sheet metal. This has been accomplished by blanking a disc from a piece of sheet metal, forming an annular channel near the periphery of the disc, then blanking inwardly radiating supporting members or arms from the center of the disc and forming or bending these supporting members so as to cause them to lie in a frusto-conical surface.

Another object of this invention is to improve upon the method of attaching a diaphragm support to the magnetic frame. This has been accomplished by spot welding the supporting arms of the support to the magnetic frame.

Another object of this invention is to improve upon the metallic frame. This has been accomplished by reinforcing the bottom of a cup-shaped housing for the metallic coil so that there is a tendency to maintain a uniform flux density throughout the magnetic path.

Another object of this invention is to improve upon the annular pole piece so as to tend to maintain a substantially uniform flux density throughout the annular pole piece and so as to properly distribute the flux in the air gap. This has been accomplished by providing an annular pole piece constructed from two ferro-magnetic annuluses, one of which has a maximum diameter equal to the maximum diameter of the cup-shaped housing.

Another object of this invention is to improve upon the method of assembling the metallic housing. This has been accomplished by welding the annular pole piece to the cup-shaped housing so as to eliminate the conventional fastening means now used, such as screws or rivets.

Another object of this invention is to improve upon the method of centering the pole pieces. This has been accomplished by providing a centering jig that holds the annular pole piece concentric with respect to the center pole piece during the welding operation.

Another object of this invention is to improve upon the method of supporting the transformer. This has been accomplished by providing supporting ears integral with adjacent sides of adjacent supporting arms of a diaphragm support so that the transformer may be attached to said ears.

Another object of the invention is to place a terminal board that is convenient and that requires short leads. This has been accomplished by placing the terminal board intermediate the transformer and the supporting ears thereby reducing the length of the input leads.

Further objects and advantages of the present invention will be apparent from the following description, reference being had to the accompanying drawings, wherein a preferred embodiment of one form of the present invention is clearly shown.

Figure 2:
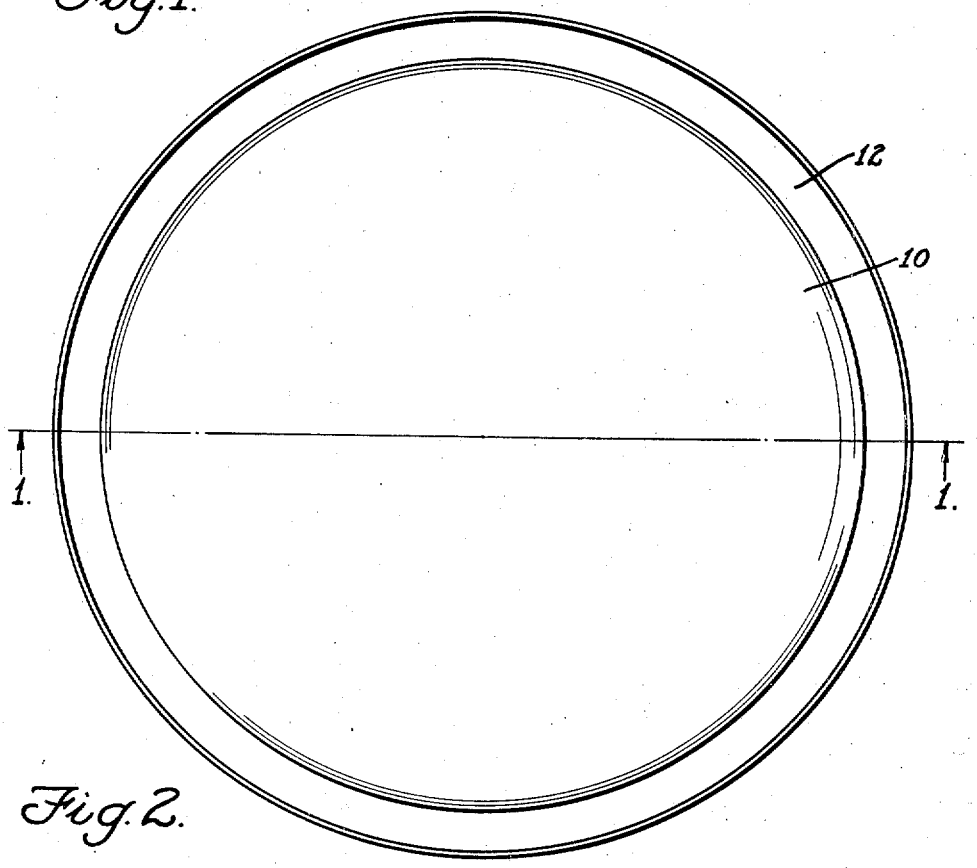

In the drawings:

Fig. 1 discloses a sectional view taken substantially on the line 1—1 of Fig. 2 so as to disclose the diaphragm supporting disc.

Fig. 2 is a plan view of the cone supporting disc before the center has been blanked and formed in the center.

Figure 3:
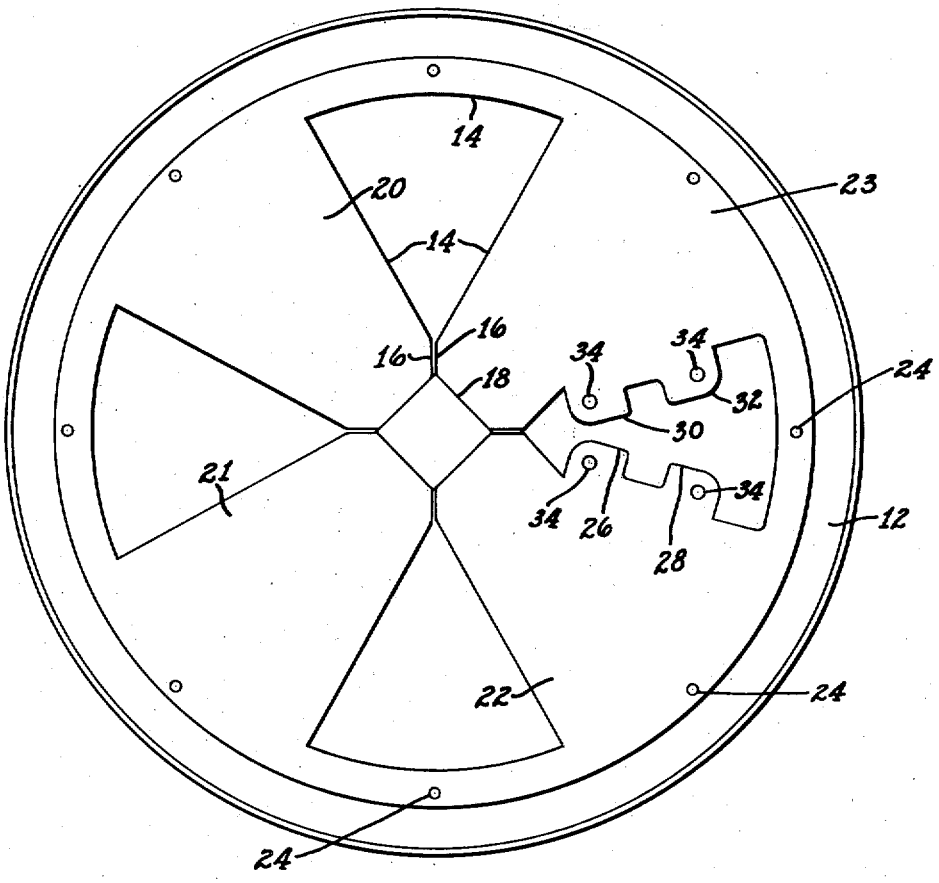

Fig. 3 discloses the cone supporting disc after the center has been blanked.

Figure 4:
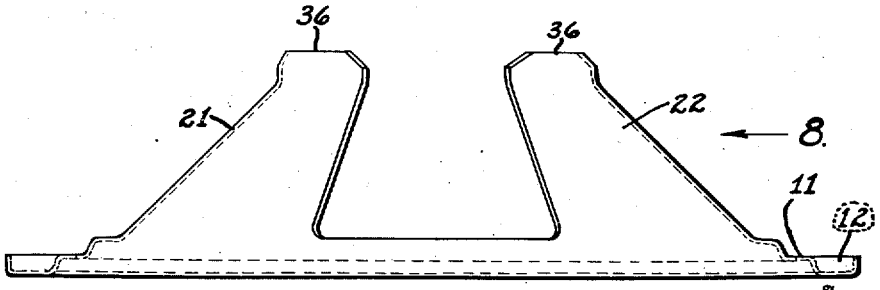

Fig. 4 discloses the cone support after the inwardly radiating supporting arms have been extruded or bent.

Figure 5:
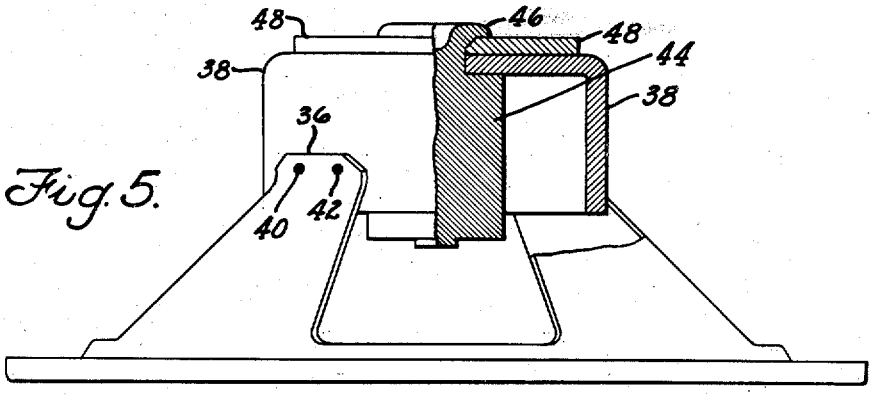

Fig. 5 discloses the cone frame structure assembly without the cone the magnet and the annular pole piece in position.

Figure 6:
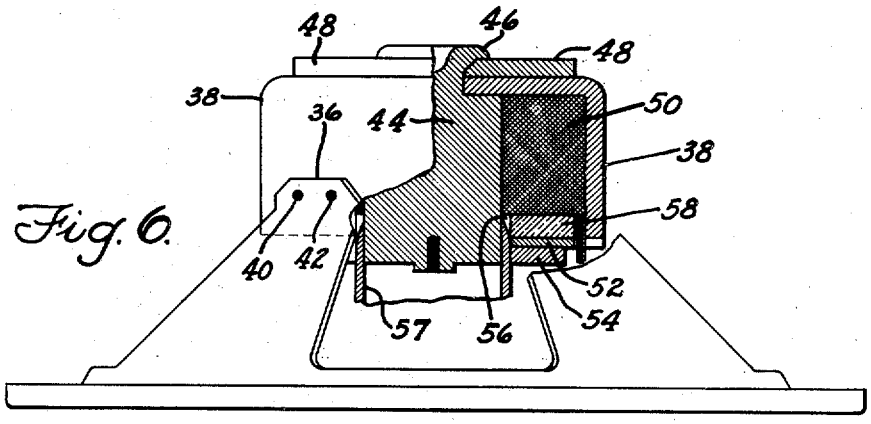

Fig. 6 discloses the assembly after the electromagnetic coil and the pole piece have been assembled but before the centering jig has been removed.

Figure 7:
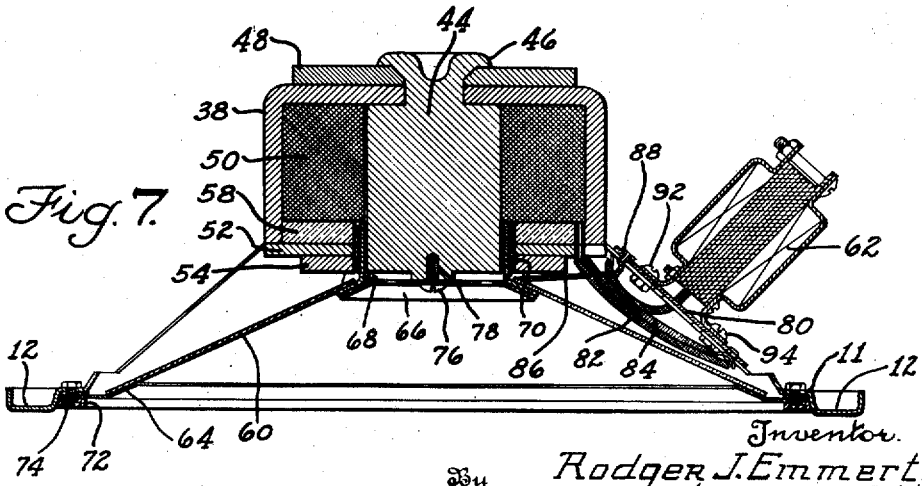

Fig. 7 discloses a sectional view of the speaker after being completely assembled.

Figure 8:
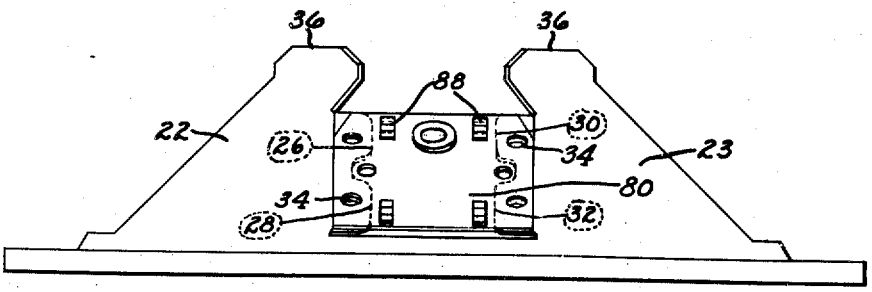

Fig. 8 discloses a side view of a cone support showing a terminal block or board in position looking in the direction of the arrow 8 in Fig. 4.

In the conventional speaker it has been customary to form the cone support from a piece of sheet metal by subjecting a circular disc provided with a concentric pole into a frusto-conically shaped support by a series of dies or forming operations. This requires large heavy presses driven by a large motor consuming much power. Consequently, these large presses are expensive to install, occupy much space and are expensive to operate.

I have found that a suitable cone support for supporting a diaphragm of an acoustic device with respect to the electro-magnet may be made by severing a circular piece 10 from a piece of sheet metal and forming a channel 12 near the periphery of the blank or circular piece 10 as best seen in Figs. 1 and 2. This may be done by means of a small press as the deformation of the channel 12 is relatively small. After this has been done the blank 10 provided with the annular channel 12 is placed in a stamping press that severs the blank along the lines 14, 16 and 18 leaving the inwardly extending radial members or arms 20, 21, 22 and 23. In the same operation the holes 24 are punched in the blank, the function of which will appear more clearly later. As best seen in Fig. 3 the supports 22 and 23 have been provided with ears or tabs 26, 28, 30 and 32 each of which has been provided with apertures 34. The function of these tabs and apertures will also appear more fully later.

After the blank has been thus formed it is placed in another die that extrudes or bends the greater portion of the material found in the area inclosed by the channel 12 so that this center portion lies substantially in the surface of a frusto-conical section. The innermost ends 36 of the radial supports 20, 21, 22, and 23 are bent to lie substantially in the surface of a cylinder so as to snugly fit the outer periphery of the cup-shaped metallic housing 38. The tabs or feet 36 of the radial supports 20, 21, 22 and 23 are spot welded at 40 and 42 to the outer periphery of the cup-shaped housing 38. This is preferably done in a suitable jig that has not been disclosed for the reason that the jig does not form a part of the invention.

The magnetic housing 38 is provided with a center pole piece 44 riveted thereto at 46. The cross sectional area of the material used in the cup-shaped housing 38 is just sufficiently large so that there is substantially the same flux density in the walls of the housing as in the center pole piece 44. The reason for doing this is the desirability of using as light a material as possible so as to reduce the cost of production and the weight of the magnetic housing. The cost of production is greatly reduced by an economical use of material and the use of lighter material requires smaller presses, less power and lighter dies.

However, when this is done the flux density of the bottom of the cup-shaped housing becomes too great in that the saturation point will be reached if a suitable flux density is maintained in the walls and the center pole piece. Consequently, in order to reduce the flux density in the bottom, a reinforcing plate 48 is placed on the bottom of the cup-shaped housing 38 so that the flux density will not become excessive. A further advantage of the reinforcing plate 48 is to give an additional support to the center pole piece 44 so that the bottom of the cup-shaped housing 38 is not as easily deformed or bent out of shape when the speaker unit is jarred or jolted.

The assembly as seen in Fig. 5 is ready for receiving the electromagnetic or field-producing coil 50 which is inserted in the annular channel found between the outer wall of the cup-shaped housing 38 and the center pole piece 44. The annular pole piece 52 is provided with the reinforcing member 54 that decreases the flux density near the air gap 56 in much the same way as the reinforcing plate 48 decreases the flux density of the bottom portion of the cup-shaped housing 38. As the air gap 56 must be uniform throughout the annular recess or groove, a centering jig 57 is inserted between the annular pole piece 52 and the center pole piece 54 during the operation of welding the annular pole piece 52 to the cup-shaped housing. A packing washer 58 placed intermediate the coil 50 and the annular pole piece 52 retains the coil 50 in the position as disclosed in Fig. 6. The annular pole piece 52 is spot welded to the housing 38 in preferably three or four places throughout its perimeter.

It can readily be seen that the support 10 for the diaphragm, the cup-shaped housing 38, the reinforcing plate 48, the center pole piece 44, the electromagnetic coil 50, the packing washer 58, and the annular pole piece 52 are all held in a relatively fixed relation as there is no chance for any relative movement between these parts without a failure in the material. Thus it is seen that a speaker assembly has been made that requires few parts, is light and rigid and is economical in cost.

The assembly shown in Fig. 6 is now ready for the frusto-conical diaphragm 60 and the mounting of the transformer 62. The conical diaphragm 60 in this particular modification includes a flexible member 64, a centering spider 66, a speech coil support 68 and a speech coil winding 70. The diaphragm assembly 60 has a flexible band or rim 64 clamped intermediate the clamping member 72 and the cone support 11. The flexible band 64, the cone support 11 and the clamping member 72 are held in position by means of the screws 74 which pass through the holes 24 in the support 11 and aligned holes in the flexible band and the clamping member.

As the diaphragm is made from fibrous material it is necessary to provide an additional support for the apex of the cone. This has been accomplished by passing a screw 76 through the spider 66 into a threaded aperture 78 in the center pole piece 44.

A terminal block or board 80 carrying suitable terminals for the leads 82 and 84 extending from the coil 50 is attached to the support by either screws 92 and 94 or other suitable fasteners passing through the holes 34 in the ears 26, 28, 30 and 32 that are integral with adjacent supporting arms 22 and 23. Likewise the leads 86, only one of which is shown, extending from the speech coil 70, are attached to the terminal board 80 at 88. A transformer 62 is carried by the terminal board 80 and rigidly held thereon by the screws 92 and 94.

While the form of embodiment of the present invention as herein disclosed, constitutes a preferred form, it is to be understood that other forms might be adopted, all coming within the scope of the claims which follow.

What I claim is:

1. A loudspeaker comprising a diaphragm, a magnet structure including a cup-shaped magnet member, a supporting member for supporting the peripheral edge of the diaphragm, said supporting member including an annular portion positioned adjacent the peripheral edge of said diaphragm and a plurality of arms integral with said annular portion, upturned portions at the free ends of said arms, means for securing said upturned portions to said cup-shaped member, a transformer supporting member, and a plurality of lugs on two of said arm portions for supporting said transformer supporting member.

2. In a loudspeaker having a substantially cone shaped diaphragm and an actuating motor attached thereto, means for supporting the rim of said diaphragm which comprises a disc having portions removed from the interior thereof to form a peripheral shelf on which said rim may rest, and a plurality of inwardly radiating arms, said arms being bent adjacent said junction with said rim to form an enclosure for said cone, the free ends of said arms being bent to extend in a direction parallel to the axis of the cone enclosure, means for securing the free bent ends to said actuating motor thereby positioning said cone in proper operating relationship with said motor, two of said arms provided at their adjacent edges with projecting ears to form supporting means for a transformer.

RODGER J. EMMERT.